(12) United States Patent
Wolf

(10) Patent No.: US 9,802,475 B2
(45) Date of Patent: Oct. 31, 2017

(54) MOTOR VEHICLE FRONT END PART

(71) Applicant: Dr. Ing. h.c. F. Porsche Aktiengesellschaft, Stuttgart (DE)

(72) Inventor: Thomas Wolf, Leonberg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/070,136

(22) Filed: Mar. 15, 2016

(65) Prior Publication Data

US 2016/0297295 A1 Oct. 13, 2016

(30) Foreign Application Priority Data

Apr. 13, 2015 (DE) .......................... 10 2015 105 567

(51) Int. Cl.
*B60K 11/08* (2006.01)

(52) U.S. Cl.
CPC .................................. *B60K 11/085* (2013.01)

(58) Field of Classification Search
CPC ....... B60K 11/04; B60K 11/08; B60K 11/085; B62D 35/02
See application file for complete search history.

(56) References Cited

U.S. PATENT DOCUMENTS

| | | | | |
|---|---|---|---|---|
| 2,913,065 A | * | 11/1959 | Lyon, Jr. ................. | B60K 11/04 123/41.06 |
| 4,457,558 A | * | 7/1984 | Ishikawa .............. | B62D 35/005 123/41.05 |
| 4,558,897 A | * | 12/1985 | Okuyama ............ | B62D 35/005 180/903 |
| 5,901,786 A | * | 5/1999 | Patel ...................... | B60K 11/04 123/41.04 |
| 6,886,883 B2 | * | 5/2005 | Jacquemard ......... | B62D 35/005 180/903 |
| 2006/0095178 A1 | * | 5/2006 | Guilfoyle ............. | B60K 11/085 701/36 |
| 2011/0203861 A1 | * | 8/2011 | Charnesky ........... | B60K 11/085 180/68.1 |
| 2013/0341110 A1 | * | 12/2013 | Butlin, Jr. ............ | B62D 35/005 180/68.1 |

FOREIGN PATENT DOCUMENTS

| | | |
|---|---|---|
| DE | 36 00 190 | 7/1986 |
| DE | 37 35 921 | 1/1988 |
| DE | 10 2013 003 848 | 9/2013 |

* cited by examiner

*Primary Examiner* — Frank Vanaman
(74) *Attorney, Agent, or Firm* — Gerald E. Hespos; Michael J. Porco; Matthew T. Hespos

(57) ABSTRACT

A motor vehicle front end part (1) has a device for influencing a cooling air flow. The device has an adjustable flap (22) that extends in a vehicle transverse direction and that is assigned to an air inlet opening (10) with an air inlet cross section (12). To provide a motor vehicle front end part that is of simple design and can be produced cost-effectively, the flap (20) is arranged in front of the air inlet cross section (12) in a vehicle longitudinal direction to such an extent that, if the flap (20) is in an operative position, the cooling air flow (22, 23) is channeled completely or virtually completely past the air inlet opening (10).

12 Claims, 2 Drawing Sheets

MOTOR VEHICLE FRONT END PART

CROSS REFERENCE TO RELATED APPLICATION

This application claims priority under 35 USC 119 to German Patent Appl. No. 10 2015 105 567.8 filed on Apr. 13, 2015, the entire disclosure of which is incorporated herein by reference.

BACKGROUND

1. Field of the Invention

The invention relates to a motor vehicle front end part having a device for influencing a cooling air flow. The device includes an adjustable flap that extends in a vehicle transverse direction and is assigned to an air inlet opening with an air inlet cross section.

2. Description of the Related Art

DE 10 2013 003 848 A1 discloses a movable front spoiler for cars that is formed by a strip or profiled bar mounted in front of a cooling air inlet so as to be rotatable about its lower edge if the spoiler is fit along the lower side of the cooling air inlet or about its upper edge if the spoiler is fit along the upper side of the cooling air inlet.

DE 36 00 190 A1 discloses a cooling device for the driving engine of a motor vehicle that has an engine radiator, a fan assigned to the engine radiator, a permanently open inlet opening and an inlet opening that can be closed by an automatically actuated flap for the cooling air in a vehicle body region situated in front of the engine radiator and fan. The permanently open inlet opening is designed for adequate cooling air supply at high driving speeds, the fan being switched on at low driving speeds under high load and the flap is arranged to be moved into its open position by the suction of the cooling air that is present during fan operation.

DE 37 35 921 C1 discloses a device for influencing the cooling air flow on a motor vehicle. The device has a flap that is fit on the front lower side of the motor vehicle and extends over the vehicle width. The flap can be pivoted about a horizontal vehicle axis, and has a control device for controlling the pivoting movement. The control device pivots out the flap toward the roadway at low speeds and/or with the vehicle at a standstill so as to prevent backflow of hot exhaust air under the vehicle to the cooling air inlet on the front side of the vehicle or to the radiator of the internal combustion engine or of a condenser of an air-conditioning system.

The object of the invention is to provide a motor vehicle front end part having a device for influencing a cooling air flow. The device comprises a movable flap that extends in a vehicle transverse direction and that is assigned to an air inlet opening with an air inlet cross section. The front end part is of simple design and can be produced cost-effectively.

SUMMARY

The invention relates to a motor vehicle front end part having a device for influencing a cooling air flow. The device comprises an adjustable flap that extends in a vehicle transverse direction and that is assigned to an air inlet opening with an air inlet cross section. The flap is arranged in front of the air inlet cross section in a vehicle longitudinal direction to such an extent that, if the flap is in an operative position, the cooling air flow is channeled completely or virtually completely past the air inlet opening. The air flow through the air inlet cross section is significantly reduced by the flap in its operative position. As a result, the air resistance of a motor vehicle equipped with the motor vehicle front end part is reduced. In its operative position, the flap displays a wind-deflecting function. Therefore, the flap can also be referred to as a wind deflector or wind-deflecting flap. If the wind-deflecting flap is in its operative position, no ram air can flow into the air inlet opening. The vehicle longitudinal direction also is referred to as the x direction. Analogously, the vehicle transverse direction also is referred to as the y direction. A vehicle height direction also is referred to as the z direction. The z direction or z axis is perpendicular to a plane defined by the x axis and the y axis. In front of the air inlet cross section in the vehicle longitudinal direction means that the flap is arranged upstream of the air inlet cross section, the term upstream relating to the air flow. The air flow flows oppositely to a forward direction of travel of the motor vehicle.

In one embodiment, the flap of the motor vehicle front end part is smaller than the air inlet cross section, thereby ensuring in a simple manner that the air inlet cross section cannot be closed by the flap. Accordingly, the air inlet cross section always remains open, at least partially, independent of the position of the flap. This affords the advantage that if a fan arranged behind a component to be cooled, such as a radiator, is running, cooling air can flow from outside through the inlet opening even when the flap is in its operative position. Moreover, the small overall height of the flap affords the advantage that the flap requires little installation space. Moreover, the relatively small flap has the advantage of being impinged by relatively small air forces. As a result, relatively small drives for adjusting the flap can advantageously be used. A relatively small drives or a plurality of small drives provide less torque and/or smaller driving power.

The air inlet opening may be provided in addition to an air path that can be closed by cooling air flaps. The configuration or arrangement of the air inlet opening with the flap affords the advantage that during a fan operation, a minimum air throughput through the air inlet opening with the air inlet cross section is maintained even when the air path is completely closed by the cooling air flaps.

The air inlet opening with the flap may be arranged below the air path that can be closed by the cooling air flaps. In this case, the air path that can be closed by the cooling air flaps constitutes an upper air path. The air inlet opening with the air inlet cross section and the flap then constitutes a lower air path. The lower air path advantageously always remains open, at least partially, independent of the position of the flap.

In a further embodiment, the flap can be moved between its operative position and an inoperative position in which the cooling air flow is not influenced by the flap. The flap may be mounted to be pivotable between its inoperative position and its operative position. A suitable drive makes it possible for the flap to be pivoted automatically between its inoperative position and its operative position. However, the flap can also be linearly displaceable or extendable.

The flap may be flush with the vehicle body in its inoperative position. Thus, a flap that is pivotable bears against a vehicle body surface in its inoperative position. If the flap is designed to be linearly displaceable or extendable, then the term flush with the vehicle body means that, in the retracted state, the flap no longer projects from the vehicle body. The flush arrangement with the vehicle body ensures that the flap that is in the inoperative position constitutes no or only insignificant resistance for the cooling air flow.

A distance between the flap and the air inlet opening in the vehicle longitudinal direction may be greater than or equal to a height of the air inlet opening. The height of the air inlet opening corresponds to a dimension of the air inlet opening in the z direction. These proportions have proved to be particularly advantageous in investigations carried out within the context of the invention.

A dimension in the z direction of the flap in its operative position corresponds at most to half the height of the air inlet opening. These proportions have proved to be particularly effective in the investigations carried out within the context of the invention.

The invention further relates to a motor vehicle having an above-described motor vehicle front end part. The arrangement of the air inlet opening with the flap is particularly suited for motor vehicles having large overhang angles. Motor vehicles having large overhang angles are, for example, all-terrain sedan, which also are referred to as sport utility vehicles (SUVs).

The invention further relates to an air flap for an above-described motor vehicle front end part and for the above-described motor vehicle. The air flap may be treated separately.

Further advantages, features and details of the invention will become apparent from the description which follows in which different exemplary embodiments are described in detail with reference to the drawing.

DETAILED DESCRIPTION

Figure 1:
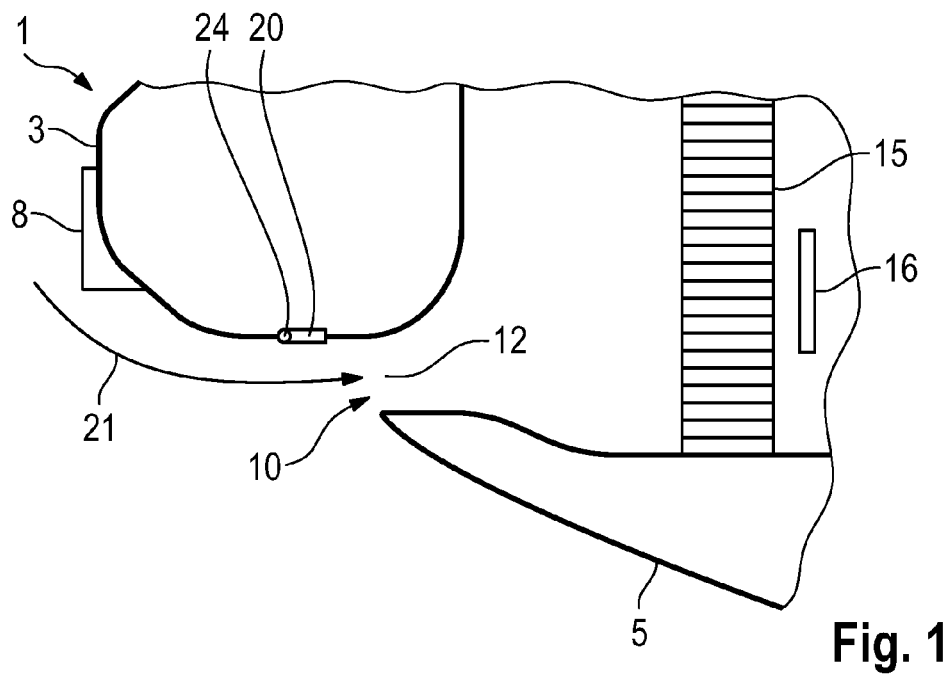
FIG. 1 shows a motor vehicle front end part having an air inlet opening and a flap in its inoperative position.
Figure 2:
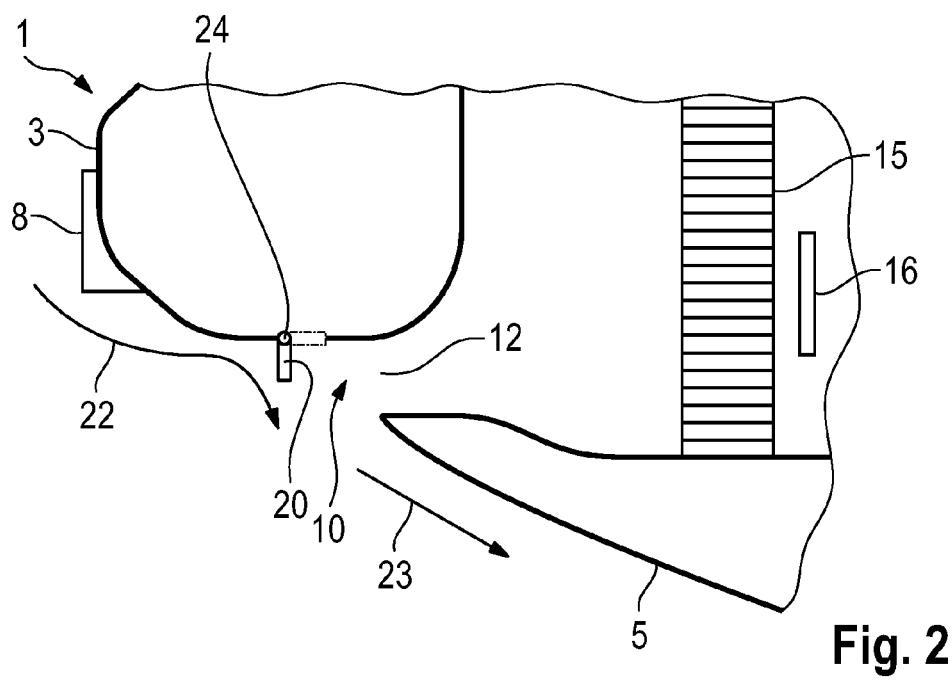
FIG. 2 shows the motor vehicle front end part of FIG. 1 with the flap in its operative position.
Figure 3:
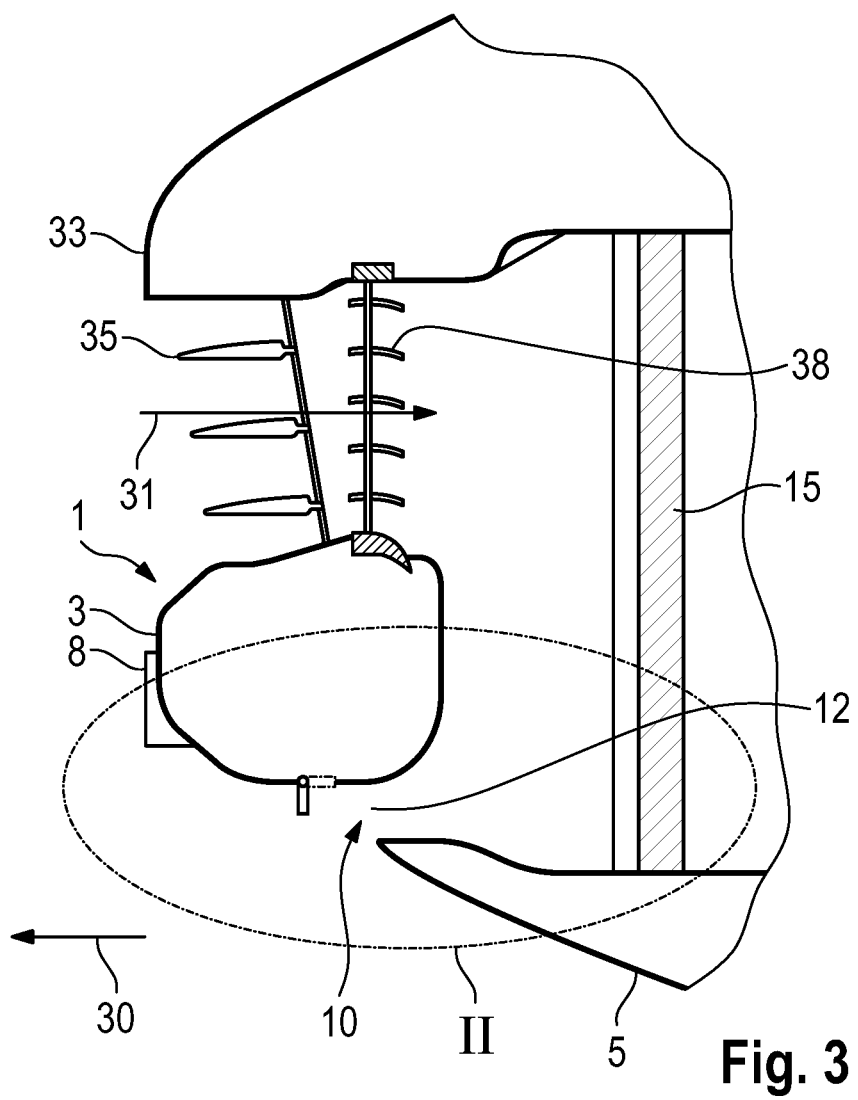
FIG. 3 is a detailed illustration of the front end of the motor vehicle and includes a broken-line ellipse II to identify the area shown in FIGS. 1 and 2.

FIGS. 1 to 3 illustrate a motor vehicle front end part 1 having a front end upper side 3 and a front end lower side 5. A motor vehicle registration plate 8 is fitted on the front end upper side 3 of the motor vehicle front end part 1.

An air inlet opening 10 is provided below the motor vehicle registration plate 8. The air inlet opening 10 has an air inlet cross section 12 through which cooling air can pass to a component 15 to be cooled. The component 15 that is to be cooled is arranged behind the air inlet opening 10 in a vehicle longitudinal direction.

The component 15 to be cooled is, for example, a radiator of the motor vehicle. A rectangle 16 behind the radiator 15 indicates a fan that can suck cooling air through the air inlet opening 10.

In FIG. 1, a flap 20 is in an inoperative position. In its inoperative position, the flap 20 is flush with the vehicle body so that, as indicated by an arrow 21, a cooling air flow passes through the air inlet cross section 12 of the air inlet opening 10 to the radiator 15.

The flap 20 can be pivoted with the aid of a pivot bearing 24 from its inoperative position illustrated in FIG. 1 into an operative position illustrated in FIG. 2. In its inoperative position, the flap 20 is arranged substantially horizontally so that the cooling air flow 21 is not influenced. In its operative position, the flap 20 is arranged substantially vertically so that a cooling air flow indicated by arrows 22 and 23 is channeled past the air inlet opening 10.

The flap 20 arranged in front of the air inlet opening 10 constitutes an open-out wind deflector which can be opened out or pivoted from its inoperative position, in which it is flush with the vehicle body, into its operative position.

As can be seen in FIG. 2, in the opened-out state, the flap 20 constituting the wind deflector deflects the air 22, 23 past the air inlet opening 10. As a result, the air resistance of a motor vehicle equipped with the motor vehicle front end part 1 is reduced.

By comparison with known closure systems, for example cooling air flaps, the flap 20 illustrated in FIGS. 1 and 2 allows a substantially more compact and simpler construction. In its operative position, which is illustrated in FIG. 2, the flap 20 has a height, i.e. a dimension in the z direction, that is to say from top to bottom in FIGS. 1 and 2, which is considerably smaller than the height of the air inlet opening 10.

FIG. 3 is an illustration of the motor vehicle front end part 1 with an ellipse II identifying the area shown in details in FIGS. 2 and 3. An arrow 30 indicates a forward direction of travel that corresponds to the vehicle longitudinal direction or x direction. FIG. 3 shows that the motor vehicle front end part 1 has a type of frame 33 that forms an air path to the radiator 15 as indicated by an arrow 31. The air path 31 extends through a grille structure 35 and can be closed completely by cooling air flaps 38.

The air path 31 constitutes an upper air path whereas the air inlet opening 10 with the air inlet cross section 12 constitutes a lower air path. If the upper air path 31 is closed by the closed cooling air flaps 38, then minimum air throughput is ensured by the lower air path 10, 12 during fan operation.

What is claimed is:

1. A motor vehicle front end part having a lower part, an upper part spaced above the lower part so that an air inlet opening is defined between the upper and lower parts, the air inlet opening having an air inlet opening height extending vertically between the lower and upper parts, the upper part projecting more forward than the lower part, the motor vehicle front end part further having a device for influencing a cooling air flow, the device comprising an adjustable flap that extends in a vehicle transverse direction and that is in proximity to the air inlet opening, the flap being arranged at a lower surface of the upper part in front of the air inlet in a vehicle longitudinal direction by a distance greater than the air inlet opening height, the flap being positionable between an operative position in which the flap projects below the lower surface of the upper part and partly blocks the air inlet opening so that a cooling air flow is channeled past the air inlet opening and an inoperative position where the flap is substantially flush with the lower surface of the upper part so that the cooling air flow is not influenced by the flap.

2. The motor vehicle front end part of claim 1, wherein the flap is smaller than the air inlet cross section.

3. The motor vehicle front end part of claim 1, further comprising an air path and cooling air flaps that can close the air path.

4. The motor vehicle front end part of claim 3, wherein the air inlet opening and the flap are arranged below the air path and the cooling air flaps.

5. The motor vehicle front end part of claim 1, wherein the flap is mounted pivotally for movement about and axis that extends in the vehicle transverse direction.

6. The motor vehicle front end part of claim 5, wherein the flap is mounted to pivot rearward when moving from the operative position to the inoperative position.

7. The motor vehicle front end part of claim 1, wherein a height dimension of the flap in the operative position is no more than half of the air inlet opening height.

8. A motor vehicle having a motor vehicle front end part of claim 1.

9. The motor vehicle front end part of claim 1, further comprising a component to be cooled rearward of the upper part and above the lower part, the air inlet opening being forward of the component to be cooled and aligned at a same height position as a lower part of the component to be cooled.

10. The motor vehicle front end part of claim 9, wherein the component to be cooled is a radiator.

11. The motor vehicle front end part of claim 10, further comprising an air path at a position above the air inlet opening and cooling air flaps that can close the air path.

12. The motor vehicle front end part of claim 11, wherein the air path is aligned at a same height as an upper part of the radiator.

* * * * *